(12) United States Patent
Andreev

(10) Patent No.: US 6,640,227 B1
(45) Date of Patent: Oct. 28, 2003

(54) UNSUPERVISED AUTOMATED HIERARCHICAL DATA CLUSTERING BASED ON SIMULATION OF A SIMILARITY MATRIX EVOLUTION

(76) Inventor: Leonid Andreev, 24217 N. 87th St., Scottsdale, AZ (US) 85255

( * ) Notice: Subject to any disclaimer, the term of this patent is extended or adjusted under 35 U.S.C. 154(b) by 406 days.

(21) Appl. No.: 09/655,519

(22) Filed: Sep. 5, 2000

(51) Int. Cl.[7] ............................................. G06F 17/30
(52) U.S. Cl. ...................................... 707/6; 707/104.1
(58) Field of Search ................................ 707/1, 4, 5, 6, 707/10, 100, 104.1, 101–2; 382/224–6, 159, 156, 197; 702/1, 179; 706/21, 45, 50; 705/10

(56) References Cited

U.S. PATENT DOCUMENTS

| | | | |
|---|---|---|---|
| 5,970,421 A | * 10/1999 | Ostrovsky ....................... | 702/1 |
| 6,049,797 A | 4/2000 | Guha et al. ..................... | 707/6 |
| 6,104,835 A | * 8/2000 | Han ............................. | 382/225 |
| 6,226,408 B1 | * 5/2001 | Sirosh .......................... | 382/224 |
| 6,260,038 B1 | * 7/2001 | Martin et al. ................... | 707/6 |
| 6,307,965 B1 | * 10/2001 | Aggarwal et al. .......... | 382/225 |
| 6,397,166 B1 | * 5/2002 | Leung et al. ................. | 705/10 |
| 6,421,668 B1 | * 7/2002 | Yakhini et al. ................. | 707/6 |

FOREIGN PATENT DOCUMENTS

JP 410108026 A * 4/1998 ........... H04N/1/411

OTHER PUBLICATIONS

Jungsoon Yoo, Chrisila Petty and Sung Yo Titled "A Hybrid Conceptual Clustering System" CSC '96 Philadelphia copyright 1996 ACM 0–89791–828–2/96/02 pp. 105–114.*

Rakesh Agrawal, Johannes Gehrke, Dimitrios Gunoplos Prabhaker Raghavan Titled "Automatic Subspace Clustering of High Dimention Data for Data Mining Application" SIGMOD '98 Seattle copyright 1998 ACM 0–89791–995–5/98/006 pp. 94–105.*

Nea Lesh M Zaki, M Ogihara Titled "Mining Features for Sequence Classification" KDD '99 San Diego copyright 1999 ACM 1–58113–143–7/99/08 pp. 342–346.*

YongSeog Kim W. Street F Menczer Titled "Feature Selection in Unsupervised Learning via Evolutionary Search" KDD 2000 Boston copyright ACM 2000 1–58113–233–6/00/08 pp. 365–369.*

Van Sickle, John. Using Mean Similarity Dendrograms to Evaluate Classifications. JABES, v.2, No. 4. Prev. row continued: pp. 370–388 (1997).

* cited by examiner

Primary Examiner—Diane D. Mizrahi

(57) ABSTRACT

A method for automated hierarchical clustering as a result of simulation of a similarity matrix evolution by the use of an algorithm for matrix transformation inducing a cooperative exchange of information within the entire pool of matrix components and resulting in retrieval of non-obvious information from the underlying data. Hierarchical clustering of matrix components is carried out by iterative transformation and division followed by transformation and division of each level clusters, or by monitoring the changes in individual binary similarities throughout transformation of the entire matrix. For monitoring of changes occurring upon matrix evolution, matrix attenuation technique is applied through the use of the mechanism of contrasting, which permits to pinpoint similarity value changes within a range of thousandths of percent. A matrix undergoing the evolution by the effect of the algorithm for matrix transformation acts as a self-learning system capable for accurate allocation of produced and accumulated information and displays abilities of a constructive element of an artificial intelligence system.

12 Claims, 22 Drawing Sheets

1101

| Site pairs | Data-in BS, % | R{1}* | R{4}* | T* |
|---|---|---|---|---|
| A6 -B93 | 33.3 | 67.2 | 62.7 | 58.6 |
| A2 - C182 | 26.7 | 44.7 | 48.8 | 42.4 |
| C182 - C206 | 81.8 | 85.3 | 85.7 | 85.0 |
| C182 - D283 | 57.1 | 74.2 | 76.2 | 72.2 |

Designations are explained in the description of replenishment operation in Detailed Description of the invention.

| | A2 | A6 | A10 | A14 | A27 | A35 | A40 | B47 | B63 | B71 | B93 | C124 | C150 | C182 | C200 | D232 | D240 | D283 | D296 | |
|---|---|---|---|---|---|---|---|---|---|---|---|---|---|---|---|---|---|---|---|---|
| A2 | 1.00 | 0.55 | 0.50 | 0.40 | 0.40 | 0.27 | 0.31 | 0.25 | 0.25 | 0.27 | 0.25 | 0.14 | 0.20 | 0.27 | 0.21 | 0.07 | 0.11 | 0.12 | 0.19 | A2 |
| | | 1.00 | 0.78 | 0.67 | 0.50 | 0.50 | 0.50 | 0.45 | 0.33 | 0.43 | 0.33 | 0.21 | 0.27 | 0.33 | 0.29 | 0.21 | 0.29 | 0.25 | 0.30 | A6 |
| | | | 1.00 | 0.86 | 0.62 | 0.62 | 0.45 | 0.40 | 0.40 | 0.38 | 0.40 | 0.25 | 0.31 | 0.38 | 0.33 | 0.25 | 0.25 | 0.29 | 0.28 | A10 |
| | | | | 1.00 | 0.71 | 0.71 | 0.50 | 0.44 | 0.44 | 0.42 | 0.44 | 0.27 | 0.33 | 0.31 | 0.25 | 0.27 | 0.27 | 0.21 | 0.21 | A14 |
| | | | | | 1.00 | 0.71 | 0.67 | 0.30 | 0.30 | 0.42 | 0.30 | 0.17 | 0.23 | 0.21 | 0.15 | 0.27 | 0.27 | 0.21 | 0.21 | A27 |
| | | | | | | 1.00 | 0.50 | 0.44 | 0.44 | 0.42 | 0.44 | 0.27 | 0.33 | 0.33 | 0.25 | 0.40 | 0.36 | 0.31 | 0.28 | A35 |
| | | | | | | | 1.00 | 0.45 | 0.45 | 0.67 | 0.45 | 0.21 | 0.36 | 0.38 | 0.29 | 0.31 | 0.47 | 0.33 | 0.37 | A40 |
| | | | | | | | | 1.00 | 0.56 | 0.50 | 0.75 | 0.50 | 0.42 | 0.38 | 0.45 | 0.25 | 0.33 | 0.29 | 0.33 | B47 |
| | | | | | | | | | 1.00 | 0.64 | 0.75 | 0.36 | 0.55 | 0.38 | 0.45 | 0.25 | 0.33 | 0.29 | 0.40 | B63 |
| | | | | | | | | | | 1.00 | 0.50 | 0.27 | 0.40 | 0.38 | 0.33 | 0.27 | 0.41 | 0.29 | 0.40 | B71 |
| | | | | | | | | | | | 1.00 | 0.55 | 0.55 | 0.50 | 0.60 | 0.36 | 0.33 | 0.38 | 0.33 | B93 |
| | | | | | | | | | | | | 1.00 | 0.64 | 0.73 | 0.70 | 0.33 | 0.50 | 0.46 | 0.39 | C124 |
| | | | | | | | | | | | | | 1.00 | 0.62 | 0.73 | 0.39 | 0.53 | 0.50 | 0.50 | C150 |
| | | | | | | | | | | | | | | 1.00 | 0.82 | 0.36 | 0.50 | 0.57 | 0.47 | C182 |
| | | | | | | | | | | | | | | | 1.00 | 0.42 | 0.47 | 0.67 | 0.53 | C200 |
| | | | | | | | | | | | | | | | | 1.00 | 0.62 | 0.58 | 0.47 | D232 |
| | | | | | | | | | | | | | | | | | 1.00 | 0.60 | 0.67 | D240 |
| | | | | | | | | | | | | | | | | | | 1.00 | 0.65 | D283 |
| | | | | | | | | | | | | | | | | | | | 1.00 | D296 |

| | A2 | A6 | A10 | A14 | A27 | A35 | A40 | B47 | B63 | B77 | B93 | C124 | C150 | C182 | C200 | D232 | D240 | D283 | D296 |
|---|---|---|---|---|---|---|---|---|---|---|---|---|---|---|---|---|---|---|---|
| A2 | 1.00 | | | | | | | | | | | | | | | | | | |
| A6 | 1.00 | 1.00 | | | | | | | | | | | | | | | | | |
| A10 | 1.00 | 1.00 | 1.00 | | | | | | | | | | | | | | | | |
| A14 | 1.00 | 1.00 | 1.00 | 1.00 | | | | | | | | | | | | | | | |
| A27 | 1.00 | 1.00 | 1.00 | 1.00 | 1.00 | | | | | | | | | | | | | | |
| A35 | 1.00 | 1.00 | 1.00 | 1.00 | 1.00 | 1.00 | | | | | | | | | | | | | |
| A40 | 1.00 | 1.00 | 1.00 | 1.00 | 1.00 | 1.00 | 1.00 | | | | | | | | | | | | |
| B47 | 1.00 | 1.00 | 1.00 | 1.00 | 1.00 | 1.00 | 1.00 | 1.00 | | | | | | | | | | | |
| B63 | 1.00 | 1.00 | 1.00 | 1.00 | 1.00 | 1.00 | 1.00 | 1.00 | 1.00 | | | | | | | | | | |
| B77 | 1.00 | 1.00 | 1.00 | 1.00 | 1.00 | 1.00 | 1.00 | 1.00 | 1.00 | 1.00 | | | | | | | | | |
| B93 | 1.00 | 1.00 | 1.00 | 1.00 | 1.00 | 1.00 | 1.00 | 1.00 | 1.00 | 1.00 | 1.00 | | | | | | | | |
| C124 | 0.00 | 0.00 | 0.00 | 0.00 | 0.00 | 0.00 | 0.00 | 0.00 | 0.00 | 0.00 | 1.00 | 1.00 | | | | | | | |
| C150 | 0.00 | 0.00 | 0.00 | 0.00 | 0.00 | 0.00 | 0.00 | 0.00 | 0.00 | 0.00 | 1.00 | 1.00 | 1.00 | | | | | | |
| C182 | 0.00 | 0.00 | 0.00 | 0.00 | 0.00 | 0.00 | 0.00 | 0.00 | 0.00 | 0.00 | 1.00 | 1.00 | 1.00 | 1.00 | | | | | |
| C200 | 0.00 | 0.00 | 0.00 | 0.00 | 0.00 | 0.00 | 0.00 | 0.00 | 0.00 | 0.00 | 1.00 | 1.00 | 1.00 | 1.00 | 1.00 | | | | |
| D232 | 0.00 | 0.00 | 0.00 | 0.00 | 0.00 | 0.00 | 0.00 | 0.00 | 0.00 | 0.00 | 1.00 | 1.00 | 1.00 | 1.00 | 1.00 | 1.00 | | | |
| D240 | 0.00 | 0.00 | 0.00 | 0.00 | 0.00 | 0.00 | 0.00 | 0.00 | 0.00 | 0.00 | 1.00 | 1.00 | 1.00 | 1.00 | 1.00 | 1.00 | 1.00 | | |
| D283 | 0.00 | 0.00 | 0.00 | 0.00 | 0.00 | 0.00 | 0.00 | 0.00 | 0.00 | 0.00 | 1.00 | 1.00 | 1.00 | 1.00 | 1.00 | 1.00 | 1.00 | 1.00 | |
| D296 | 0.00 | 0.00 | 0.00 | 0.00 | 0.00 | 0.00 | 0.00 | 0.00 | 0.00 | 0.00 | 1.00 | 1.00 | 1.00 | 1.00 | 1.00 | 1.00 | 1.00 | 1.00 | 1.00 |

202

301

|   |      |      |      |      |
|---|------|------|------|------|
| A | 0.56 |      |      |      |
| B | 0.39 | 0.61 |      |      |
| C | 0.26 | 0.44 | 0.70 |      |
| D | 0.26 | 0.32 | 0.47 | 0.60 |
|   | A    | B    | C    | D    |

$$S_{A,B}^T = \sqrt[n]{\prod_{i=1}^{n} \frac{\min(S_{i(A)}^{T-1}, S_{i(B)}^{T-1})}{\max(S_{i(A)}^{T-1}, S_{i(B)}^{T-1})}}$$

```
CFloatArray    temp = pSimilarityMatrix;

for (int a = 0; a < cxSize; a++)
{
        for (int b = a+1; b < cxSize; b++)
        {
                long double      result = 1.0;

for (int i = 0; i < cxSize; i++)
                {
                        long double     x = temp.GetAt(a, i);
                        long double     y = temp.GetAt(b, i);
                        result *= min(x,y) / max(x,y);
                } result = pow(res,1.0/cxSize);
                SetSimilarityMatrix(a, b, result);
                SetSimilarityMatrix(b, a, result);
        }
}
```

$$S^R_{A,B} = \sqrt[n \cdot x]{\prod_{i=1}^{n \cdot x} \frac{\min(S^O_{i(A)}, S^O_{i(B)})}{\max(S^O_{i(A)}, S^O_{i(B)})}}$$

|  | D232 | D240 | D283 | D296 |  |
|---|---|---|---|---|---|
|  | 100.0 | 61.5 | 58.5 | 47.1 | D232 |
|  |  | 100.0 | 60.0 | 66.7 | D240 |
|  |  |  | 100.0 | 64.7 | D283 |
|  |  |  |  | 100.0 | D296 |

| D240 | 100.0 |  |  |  |
|---|---|---|---|---|
| D283 | 75.9 | 100.0 |  |  |
| D296 | 75.0 | 74.3 | 100.0 |  |
| D232 | 71.4 | 71.0 | 65.5 | 100.0 |
|  | D240 | D282 | D296 | D232 |

|  | D232 | D240 | D283 | D296 |  |
|---|---|---|---|---|---|
|  | 100.0 | 92.9 | 90.9 | 86.3 | D232 |
|  |  | 100.0 | 91.2 | 86.2 | D240 |
|  |  |  | 100.0 | 86.4 | D283 |
|  |  |  |  | 100.0 | D296 |

| D240 | 100.0 |  |  |  |
|---|---|---|---|---|
| D283 | 99.9 | 100.0 |  |  |
| D296 | 99.0 | 99.0 | 100.0 |  |
| D232 | 94.8 | 94.8 | 95.2 | 100.0 |
|  | D240 | D282 | D296 | D232 |

|  | D232 | D240 | D283 | D296 |  |
|---|---|---|---|---|---|
|  | 100.0 | 100.0 | 99.5 | 95.8 | D232 |
|  |  | 100.0 | 99.5 | 95.8 | D240 |
|  |  |  | 100.0 | 96.0 | D283 |
|  |  |  |  | 100.0 | D296 |

| D240 | 100.0 |  |  |  |
|---|---|---|---|---|
| D283 | 100.0 | 100.0 |  |  |
| D296 | 100.0 | 100.0 | 100.0 |  |
| D232 | 97.0 | 97.0 | 97.0 | 100.0 |
|  | D240 | D282 | D296 | D232 |

$$[S_{x,y}]_C = \frac{\exp[(\exp S_{x,y} - 1)^{\alpha C}] - 1}{\exp(e - 1)^{\alpha C} - 1}$$

|  | D240 | D283 | D296 | D232 |  |
|---|---|---|---|---|---|
|  | 100.0 | 100.0 | 100.0 | 73.8 | D240 |
|  |  | 100.0 | 100.0 | 73.8 | D283 |
|  |  |  | 100.0 | 73.8 | D296 |
|  |  |  |  | 100.0 | D232 |

| D240 | 100.0 |  |  |  |
|---|---|---|---|---|
| D283 | 100.0 | 100.0 |  |  |
| D296 | 100.0 | 19.0 | 100.0 |  |
| D232 | 19.0 | 19.0 | 19.0 | 100.0 |
|  | D240 | D283 | D296 | D232 |

|  | D240 | D283 | D296 | D232 |  |
|---|---|---|---|---|---|
|  | 100.0 | 100.0 | 100.0 | 0.1 | D240 |
|  |  | 100.0 | 100.0 | 0.1 | D283 |
|  |  |  | 100.0 | 0.1 | D296 |
|  |  |  |  | 100.0 | D232 |

| D240 | 100.0 |  |  |  |
|---|---|---|---|---|
| D283 | 100.0 | 100.0 |  |  |
| D296 | 100.0 | 100.0 | 100.0 |  |
| D232 | 0.0 | 0.0 | 0.0 | 100.0 |
|  | D240 | D282 | D296 | D232 |

| Site pairs | Data-in BS, % | R{1}* | R{4}* | T* |
|---|---|---|---|---|
| A6 -B93 | 33.3 | 67.2 | 62.7 | 58.6 |
| A2 - C182 | 26.7 | 44.7 | 48.8 | 42.4 |
| C182 - C206 | 81.8 | 85.3 | 85.7 | 85.0 |
| C182 - D283 | 57.1 | 74.2 | 76.2 | 72.2 |

Designations are explained in the description of replenishment operation in Detailed Description of the invention.

|  | A2 | A40 | B47 | B63 | B77 | B93 | A6 | A10 | A14 | A27 | A35 |
|---|---|---|---|---|---|---|---|---|---|---|---|
| A2 | 100.0 | 100.0 | 100.0 | 100.0 | 100.0 | 100.0 | 10.3 | 10.3 | 10.3 | 10.3 | 10.3 |
| A40 | 100.0 | 100.0 | 100.0 | 100.0 | 100.0 | 100.0 | 10.3 | 10.3 | 10.3 | 10.3 | 10.3 |
| B47 | 100.0 | 100.0 | 100.0 | 100.0 | 100.0 | 100.0 | 10.3 | 10.3 | 10.3 | 10.3 | 10.3 |
| B63 | 100.0 | 100.0 | 100.0 | 100.0 | 100.0 | 100.0 | 10.3 | 10.3 | 10.3 | 10.3 | 10.3 |
| B77 | 100.0 | 100.0 | 100.0 | 100.0 | 100.0 | 100.0 | 10.3 | 10.3 | 10.3 | 10.3 | 10.3 |
| B93 | 100.0 | 100.0 | 100.0 | 100.0 | 100.0 | 100.0 | 10.3 | 10.3 | 10.3 | 10.3 | 10.3 |
| A6 | 10.3 | 10.3 | 10.3 | 10.3 | 10.3 | 10.3 | 100.0 | 100.0 | 100.0 | 100.0 | 100.0 |
| A10 | 10.3 | 10.3 | 10.3 | 10.3 | 10.3 | 10.3 | 100.0 | 100.0 | 100.0 | 100.0 | 100.0 |
| A14 | 10.3 | 10.3 | 10.3 | 10.3 | 10.3 | 10.3 | 100.0 | 100.0 | 100.0 | 100.0 | 100.0 |
| A27 | 10.3 | 10.3 | 10.3 | 10.3 | 10.3 | 10.3 | 100.0 | 100.0 | 100.0 | 100.0 | 100.0 |
| A35 | 10.3 | 10.3 | 10.3 | 10.3 | 10.3 | 10.3 | 100.0 | 100.0 | 100.0 | 100.0 | 100.0 |

1301

|      | C124  | C150  | C182  | C206  | D232  | D249  | D283  | D296  |
|------|-------|-------|-------|-------|-------|-------|-------|-------|
| C124 | 100.0 | 100.0 | 100.0 | 100.0 | 0.0   | 0.0   | 0.0   | 0.0   |
| C150 | 100.0 | 100.0 | 100.0 | 100.0 | 0.0   | 0.0   | 0.0   | 0.0   |
| C182 | 100.0 | 100.0 | 100.0 | 100.0 | 0.0   | 0.0   | 0.0   | 0.0   |
| C206 | 100.0 | 100.0 | 100.0 | 100.0 | 0.0   | 0.0   | 0.0   | 0.0   |
| D232 | 0.0   | 0.0   | 0.0   | 0.0   | 100.0 | 100.0 | 100.0 | 100.0 |
| D249 | 0.0   | 0.0   | 0.0   | 0.0   | 100.0 | 100.0 | 100.0 | 100.0 |
| D183 | 0.0   | 0.0   | 0.0   | 0.0   | 100.0 | 100.0 | 100.0 | 100.0 |
| D296 | 0.0   | 0.0   | 0.0   | 0.0   | 100.0 | 100.0 | 100.0 | 100.0 |

```
void SimTree::Calculate(SimMatrix *m, TreeNode *node)
{
vector<int> index1;
vector<int> index2;

if (m->m_nSize < 3)
{
        // only one or two components left in the matrix
        for (int i = 0; i < m->m_nSize; i++)
        {
                node->m_strNames.push_back(m->m_strNames[i]);
        }
        return;
} if(!node)
{
        // node doesn't exist: create a new one and update the member variable
        m_pTree = new TreeNode;
        node = m_pTree;
}

// transform the matrix 'TRANSFORMATIONS' number of times
m->Iterate(TRANSFORMATIONS);

// add the first element of the matrix to the first index list
index1.push_back(0);

// pick the first group
for (int i = 1; i < m->m_nSize; i++)
{
        // obtain the attenuated similarity coefficient
        double n = (SimMatrix::Contrast(m->m_pData[i], 100.0));

if (n == 1.0)
        {
                // if the attenuated similarity coefficient is 100%, add a reference to the first
                // index list
```

```
            index1.push_back(i);
        }
        else
        {
            // otherwise, add a reference to the second index list
            index2.push_back(i);
        }
    }

// restore the original matrix
    m->Restore();

if (index2.size() == 0)
    {
        // this matrix will not divide any further, so save the names and return
        for (int i = 0; i < m->m_nSize; i++)
        {
            node->m_strNames.push_back(m->m_strNames[i]);
        }
        return;
    }

// create two matrices for each node
    SimMatrix     *L = new SimMatrix;
    SimMatrix     *R = new SimMatrix;

L->m_nSize = index1.size();
    L->m_pData = new double[index1.size()*index1.size()];
    R->m_nSize = index2.size();
    R->m_pData = new double[index2.size()*index2.size()];

for (i = 0; i < index1.size(); i++)
    {
        for (int j = 0; j < index1.size(); j++)
        {
            L->m_pData[i+j*index1.size()] =
                m->m_pData[index1[i]+index1[j]*m->m_nSize];
        }
```

```
              L->m_strNames.push_back(m->m_strNames[index1[i]]);
      } for (i = 0; i < index2.size(); i++)
      {
              for (int j = 0; j < index2.size(); j++)
              {
                      R->m_pData[i+j*index2.size()] = m->m_pData[index2[i]+index2[j]*m->m_nSize];
              }
              R->m_strNames.push_back(m->m_strNames[index2[i]]);
      }

// update the matrices with the new names and components
      L->Refresh();
      R->Refresh();

// recurse through the left branch
      if (L->m_nSize)
      {
              node->Left = new TreeNode;
              Calculate(L, node->Left);
      }

// recurse through the right branch
      if (R->m_nSize)
      {
              node->Right = new TreeNode;
              Calculate(R, node->Right);
      }

// delete the temporary matrices
      delete L;
      delete R;
}
```

FIG. 15 (continued)

UNSUPERVISED AUTOMATED HIERARCHICAL DATA CLUSTERING BASED ON SIMULATION OF A SIMILARITY MATRIX EVOLUTION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention relates to methods for automated computerized clustering of data in any field of science and technology dealing with data processing.

Data clustering is a quest for order in chaos of data associated with objects under study and is meant to locate associative and genetic links between the objects. In data mining processes, clustering helps to discover the data distribution and patterns in the underlying data, thus increasing the practical and scientific value of a dataset. Most of the clustering techniques consist in data arrayal in such a way as to position the data points in the order of their compliance with certain criterion function of a search and then to join them in clusters based on scores of compliance with the search criterion function. Computer-implemented clustering methods work in an automated mode based on a pre-set criterion function of a search.

In most cases, a set of data associated with objects under study can be presented in the form of a similarity matrix which makes an original massif of data ready for comparative analysis and clustering based on calculated scores of similarity between objects, usually normalized within a range from 0 to 1 or 0 to 100%. Entries within a similarity matrix are then rearranged based on possibly highest proximity of quantitative characters, thus forming clusters and subclusters.

FIG. 1 shows a similarity matrix where $S_{(x,y)}$ is a score of similarity between objects x and y computed by any known technique. Even in cases when all n components of a matrix belong to a closely bound "natural" association of objects, such as, for example, a group of enterprises producing a certain type of goods by a certain type technology, or a group of taxonomically close microorganisms, or fish communities of different sections of a river, etc., a similarity matrix per se presents merely a tray of binary similarity cells (BS-cells) arranged according to man-made rules, while the true informational interrelation between the objects oftentimes remains unknown. In order to uncover the underlying infrastructure of informational relationships between the objects, a similarity matrix needs to be analyzed with the use of special techniques, in particular, clustering. A traditional approach to similarity matrix analysis implies that each of the $0.5(n^2-n)$ binary similarity values is checked out and added to a pool of binary similarities of a certain group or subgroup.

However, it is easy to prove that the following is true for the matrix shown in FIG. 1:

$$S_{(A,B)} = 1 \cdot S_{(A,C)}/S_{(B,C)} \approx \ldots \approx S_{(A,n)}/S_{(B,n)},$$

i.e. that the 2n-4 cells, too, contain the important and mostly non-additive information, in a non-linear form, on each of the binary similarity cells. Simply put, two similarity coefficients, $S_{(A,C)}$ and $S_{(B,C)}$, hide the information about $S_{(A,B)}$ which is not retrievable by the heretofore utilized methods for data mining. No generalized approach to solving the problem of extraction of hidden non-linear information has heretofore been proposed.

All heretofore existing methods for data clustering were based on processing of a similarity matrix in a stand-by state as, for example, statistical methods for BS processing in search for object correlations; or in its quasi-dynamic state when BS-cells are purposefully rearranged based on either simple criteria of obvious proximity, or according to more elaborate rules of data point sorting. In both types of a matrix processing, BS-cells remain intact or subjected to a parallel transfer to a different coordinate system.

The following is an example of data clustering based on analysis of a similarity matrix in its static state. In "Using Mean Similarity Dendrograms to Evaluate Classifications" (Van Sickle, 1997), similarity analysis is based on comparisons of mean similarities between objects within the same class to mean similarities between objects of different classes. The author analyzes similarities of a river's various sites based on fish species presence/absence by using the data on the numbers of species common to the two sites and the numbers of species unique to each site, based on the data from three surveys conducted in 1944, 1983 and 1992 on fish assemblages along a 281-km stretch of the main-stem of Willamette River, Oreg. Earlier, other researchers (Hughes et al., 1987) hypothesized that four contiguous sections of the river's 281-km stretch beginning at the river mouth, that could be distinguished based on channel depth and mapped channel gradients, would effectively correlate with the specifics of the river's fish communities. The river's four sections were identified as follows:

1) Section A, with 7 sites (a freshwater tidal section),
2) Section B, with 4 sites (a flat pool section),
3) Section C, with 4 sites (a section with low map gradient), and
4) Section D, with 4 sites (a shallow, upper section with higher map gradient).

FIG. 2A presents the similarity matrix of the data on fish assemblages sampled at Willamette river sites as given in the above referenced work by Van Sickle (1997). As is seen, it does not quite corroborate with the hypothesis of Hughes et al. (1987): the scores of similarity between different sites of the river's Section D vary within the range of 47 to 67%; within Section C, from 62 to 82%; within Sections B and A, 50–75% and 27–86%, respectively. The ranges of variation of similarity between the sections do not yield any convincing information either: e.g. the score of similarity between Sections A and D varies within the range of 6.7% to 40.0%, i.e. changing almost six-fold.

Based on the above shown similarity matrix, the author derives a mean similarity matrix based on mean similarities within each river section and between the sections. As is seen from the mean similarity matrix derived by Van Sickle (1997) and shown in FIG. 3, the similarities between the river's sections vary from 26 to 47%, while the similarities between individual sites within a section vary from 56 to 70%, thus showing that there is actually no remarkable difference between the lowest similarity score within clusters (56%) and the highest similarity score between different clusters (47%). Thus, the mean similarity-based analysis, as well as other mathematical statistics methods, which are used in data clustering merely out of "scientific correctness", has little, if any, value in understanding the data underlying the study. This is an example of "premeditated clustering" when mathematical statistics methods are applied to offer a proof of a certain assumption, or to substantiate an a priori designed clustering. From the following description of the present invention, it is seen that the method of this invention allows for finding perfect correlations in the above referenced data.

Another approach to clustering is based on analysis of a similarity matrix according to more sophisticated rules of data matching and sorting. For example, in the method described by Guha et al. in Programmed Medium For Clustering Large Databases (U.S. Pat. No. 6,092,072, Jul. 18, 2000), data points that may qualify for inclusion into a certain cluster are spotted in the chaos of data-in information by use of iterative procedures based on determining a total number of links between each cluster and every other cluster based upon an assigned pair of points to be neighbors if their similarity exceeds a certain threshold. Calculating a distance between representative points, then merging a pair of clusters having a closest pair of representative points, then calculating a mean of said representative points for said merged cluster, selecting a number of scattered data points from said representative points of said merged cluster and establishing a new set of representative points for said merged cluster by shrinking said number of scattered points toward the mean of the said cluster, and repeating those steps until a predetermined termination condition is met, clustering is performed along with eliminating outlier data points.

Unlike the above referenced purely statical approach when the positions of BS-cells do not change (Van Sickle, 1997), in the latter method, the BS-cells are continuously relocated as long as it takes a programmed medium to sort them out by agglomerating into a system with the lower informational entropy than that of an initial database.

There is a variety of other techniques for data clustering based on the heretofore accepted approach to data processing which can be described as "uncooperative processing" meaning that a similarity matrix is studied based on unchanging BS-cells (treated as sacred properties of experimentally obtained or compiled data) which are put together or apart at a discretion of a test system put into the basis of computer-implemented automated procedures. Alternatively, a cooperative processing of data involves a similarity matrix into a process that makes the matrix evolute and manifest, in the "natural" course of evolution, the genuine relationships between the objects under study. Speaking in terms of developmental biology, the evolution of a similarity matrix turns the bulk cells (BS-cells) into a body with differentiated organs (clusters, subclusters, sub-subclusters). There is a strong need for such a conceptually new method for data clustering based on cooperative processing of data which should provide for locating, extracting and consolidating the information contained in each BS-cell which indirectly represents each similarity value.

BRIEF SUMMARY OF THE INVENTION

This invention provides a method, apparatus and algorithms for cooperative processing of a similarity matrix in the course of the matrix evolution resulting in discovery of the links of similarities and dissimilarities underlying in a non-obvious form in the matrix, hence the retrieval of additional unforeseen information about the components of the matrix.

The invention accomplishes the above and other objects and advantages by providing a method for unsupervised data clustering in the course of consecutive and irreversible transformations of a similarity matrix according to such algorithms that induce specific evolution of the matrix up to its asymptotic transition to an ultimately evolved state after which no further evolution is possible. Thus, the induced matrix evolution itself provides for clustering, however not according to deliberately imposed cluster boundaries, but reflecting the genuine relationship between similarities and differences of the components as revealed by the use of mechanism of evolution simulation.

The data-out represents a qualitatively new information extracted from the data-in, and the unforeseen relationships between objects under study can easily be uncovered by the use of the special techniques being an integral part of the method described in the present invention.

In order to trace the dynamics of a matrix up to the late stages of asymptotic transition towards the limit, the matrix is attenuated by means of introduction of a function of contrast. This allows for clear distinguishing of even such subtle changes of BS values as within a range from 0.99995 to 1.000.

Since the mechanism of a similarity matrix evolution provides for clustering in an auto-correlative mode, a complete hierarchical clusterization of the total of all objects under study can be performed in an automated mode as a uniform procedure, without setting forth any subjective conditions. Each of the clusters obtained upon the level-one division automatically undergoes further clustering by TDT-processing (transformation-division-transformation), and so on as long as there exist any detectable differences between the objects under analysis. The results of clustering can be presented in the form of dendrograms or trees predetermined by and derived from the similarities and differences contained in the original matrix and unfolded during its evolution.

As a rule, unsupervised hierarchical clustering permits to find new unexpected information in the analyzed data. According to the second preferred embodiment of this invention, the extraction of heuristic information is efficiently enhanced by utilization of the technique of DBS-processing (analysis of dynamics of binary similarity) instead of TDT-processing step. To facilitate the process of information mining, all binary similarities displayed by a matrix during its evolution are recorded in the course of processing. DBS-processing technique permits to obtain a map of distribution of similarities between the matrix components (objects) which allows for evaluation of clusterization capacity of the matrix. A map showing a homogenous distribution of curves of dependence of BS on the number of evolution stages points to a low clusterization capacity of a matrix, and, alternatively, distinct gaps between the bundles of curves of BS dynamics correspond to hiatuses between individual clusters and indicate that the matrix has a high clustering capacity.

The advantage of DBS-processing is in its capability of fast and accurate locating of closest analogs of analyzed objects in the process of informational search.

A similarity matrix evoluting in accordance with the algorithm described of this invention is a self-learning system wherein the information accumulated in the process of transformation is conveyed to a newly derived successor-matrix which, in its turn, accumulates a new layer of information based on the associative capacity of a predecessor-matrix and conveys it to the next successor-matrix. This process is accompanied with self-occurring clustering, i.e. the transformation process itself attributes the produced information, finally and irreversibly, to the respective groups of objects. Such groups may either be individually subjected to further evolutionary transformation, or combined with related clusters produced by other matrices undergoing parallel transformation and enter a new cycle of transformation. This advantage of an evolving matrix makes it usable as a constructive element of an artificial intelligence system.

BRIEF DESCRIPTION OF THE DRAWINGS

The foregoing and other aspects and advantages of the present invention will be better understood from the following detailed description of the invention with reference to the drawings, in which:

FIGS. 2A and 2B are illustrations of, respectively, a target similarity matrix of 19 sites and 4 sections A, B, C, and D of Willamette River, Oreg., from the study on fish assemblages distribution (Van Sickle, 1997), and of the resulting matrix obtained by 400-step transformation, at a contrast coefficient being 100.

FIG. 3 is a mean similarity matrix presented by Van Sickle (1997) as a result of statistical processing of the target matrix shown in FIG. 2A.

FIG. 4 is Formula 1, utilized for simulation of a similarity matrix evolution, wherein $S_{A,B}^T$ is a binary similarity coefficient after transformation No. T; "n" is a number of objects associated with a matrix; A, B, and i are objects associated with a matrix; "min" and "max" mean that a ratio of $S_{i(A)}^T$ to $S_{i(B)}^T$ are normalized to 1.

FIG. 5 is the algorithm of simulation of a similarity matrix evolution.

FIG. 6 is Formula 2, utilized for "replenishment" of a target similarity matrix, wherein $S_{i(A)}^O$, $S_{i(B)}^O$, etc. are original similarity coefficients; $S_{A,B}^R$ is a similarity coefficient derived upon replenishment operation; and x a number of missing components in a target matrix under replenishment.

FIGS. 7A–7F illustrate, respectively, a Sector D fragment of a target matrix from FIG. 2A (zero transformation, or T=0), and the resulting matrices: upon one-stage transformation (T=1), 2-stage transformation (T=2), 8-stage transformation (T=8), 11-stage transformation (T=1), 40-stage transformation (T=40).

FIG. 8 is Formula 3 utilized for computation of an attenuated similarity coefficient, $[S_{xy}]_C$, by applying contrast value of C to original similarity coefficient $S_{x,y}$; e is a natural number, α is a constant equal to 0.082.

FIGS. 10A–10D are illustrations of resulting matrix obtained from the matrix shown in FIG. 7A by 1,000-stage transformation at contrast values of 25, 50, 75 and 100, respectively.

FIG. 11 is an illustration of results of replenishment performed on a target matrix from FIG. 2A

FIG. 13 is an illustration of the result of 400-step transformation of the CD-matrix (fragment of the matrix shown in FIG. 2A presented by Van Sickle, 1997) at a contrast value of 100.

FIG. 15 is an algorithm of dendrogram construction in the process of automated clustering by TDT-processing.

DETAILED DESCRIPTION OF THE INVENTION

Figure 1:
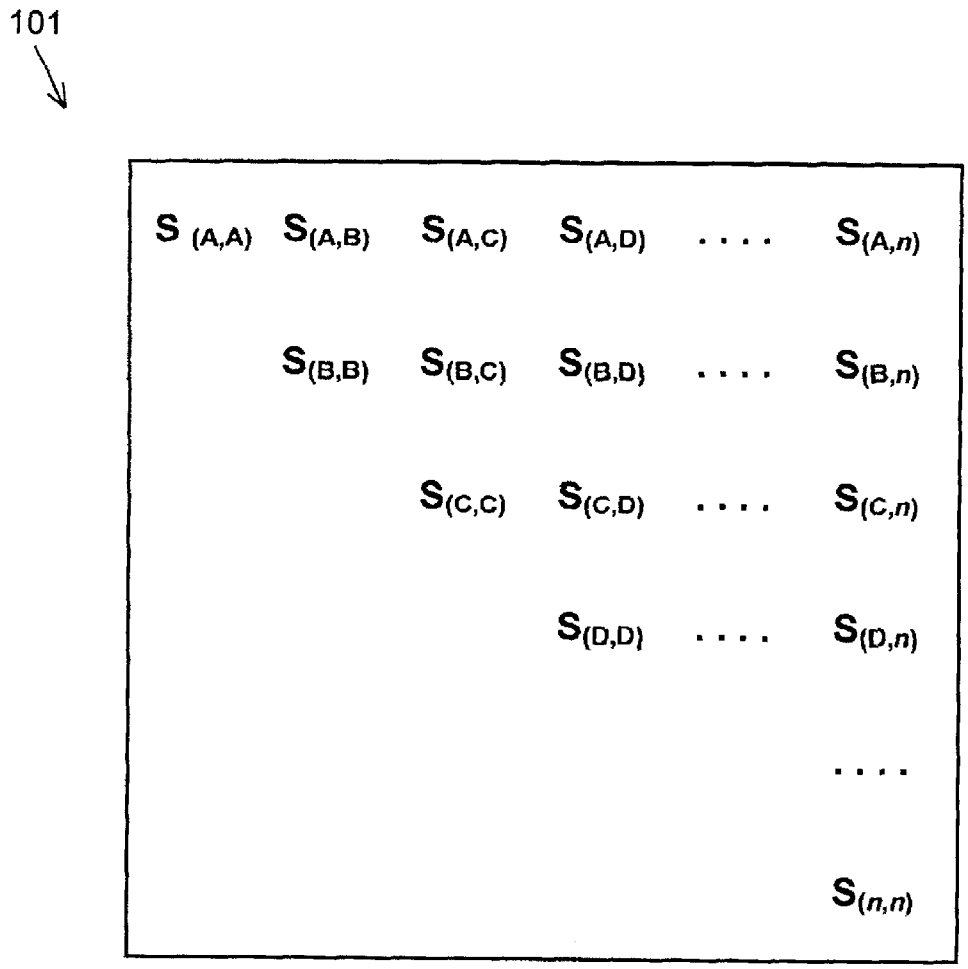
FIG. 1 is a similarity matrix of n-components.

According to the present invention, a similarity matrix, normalized within a range from 0 to 1, is exposed to an effect of a certain function, i.e. put under transformation, so that each of the binary similarity values, $S_{x,y}$, is replaced by a certain average value derived from all the 2n–3 values of $S_{x,i}$ and $S_{y,i}$. The said function produces such an effect that:

(a) starting with the first transformation, each newly derived matrix is ensuant on the previous one (principle of successive evolution in a quasi-continuous mode);

(b) a series of iterative transformations make the $S_{x,y}$ value reach the limit which in a general case equals 1 (principle of the limit of process);

(c) lim $S_{x,y}$ values may differ in different binary similarities; and (d) lim $S_{x,y}$ values are reached at different stages of iterative transformation (principle of expressed dynamics).

The evolutionary transformation formula set forth by the present invention is shown in FIG. 4 and is referred to as Formula 1 of this invention. The algorithm of computation of Formula 1 shown in FIG. 5.

If one or more S values are missing in a target matrix, they can be recovered based on available S values by the use of a matrix replenishment technique covered by the scope of the present invention and demonstrated in detail further in the description of this invention. To recover missing S values, the matrix replenishment formula is set forth by the present invention and is shown as Formula 2 in FIG. 6. Formula 2 is the modification of Formula 1 shown in FIG.

4. The same procedure is applied to matrices where some of S values equal 0.

When one or more S values in a target matrix are close to 0 or are negative, which may occur upon use of imperfect techniques of computation of similarity coefficients, the whole target matrix must be repared by replacing original S values by their respective exp(S) values. With both versions of a target matrix—containing original S values and on exp(S) values—the results will be either identical or almost identical, by the virtue of the algorithm of evolutionary transformation and constituting one of the remarkable features of the said algorithm. Furthermore, a natural e number may be replaced by any other user-friendly base of an exponential function such as 2, 10, etc. The fact that the evolution of both S- and exp(S)-matrix occurs along the same path supports the phylosophy of the present invention: in data mining, the information to dig for is contained not in the absolute values of the experimentally measured parameters pertinent to a matrix components, but in the internal environment within the system of components represented by a matrix and in non-additive cooperation between the components.

We will show now what happens to a matrix in the course of transformation. FIG. 7B illustrates the result of a one-stage transformation of the FIG. 7A target matrix of similarities between 4 sites of the river's Section D referred to above in the invention background description: as is seen, the resulting matrix displays a drastic increase of the similarity coefficients: the similarity between sites D240 and D283 increases by over 25% from 60.0% to 75.9%. FIG. 7C illustrates the result of a 2-stage transformation of the same target matrix: the similarity between sites D240 and D283 in the resulting matrix is within the range of 99.8–99.0%. FIG. 7D illustrates the result of the 8-stage transformation whereby the similarity value for sites D240 and D283 reaches 99.8%. After the 11-stage transformation, the similarity value for these two sites reaches 100% as shown in FIG. 7E. As for site D232 (FIG. 7F) as compared to all other three sites, its similarity coefficient was increasing throughout as long as 40-stage transformation to 97.0%. Upon further transformation procedure up to 10,000-stage transformation the S value remained at the level of 97%. As is seen from the above illustrations, not only end results of transformation are different for different objects, but the dynamics of their similarity coefficient transformations display certain specifics.

Figure 9:
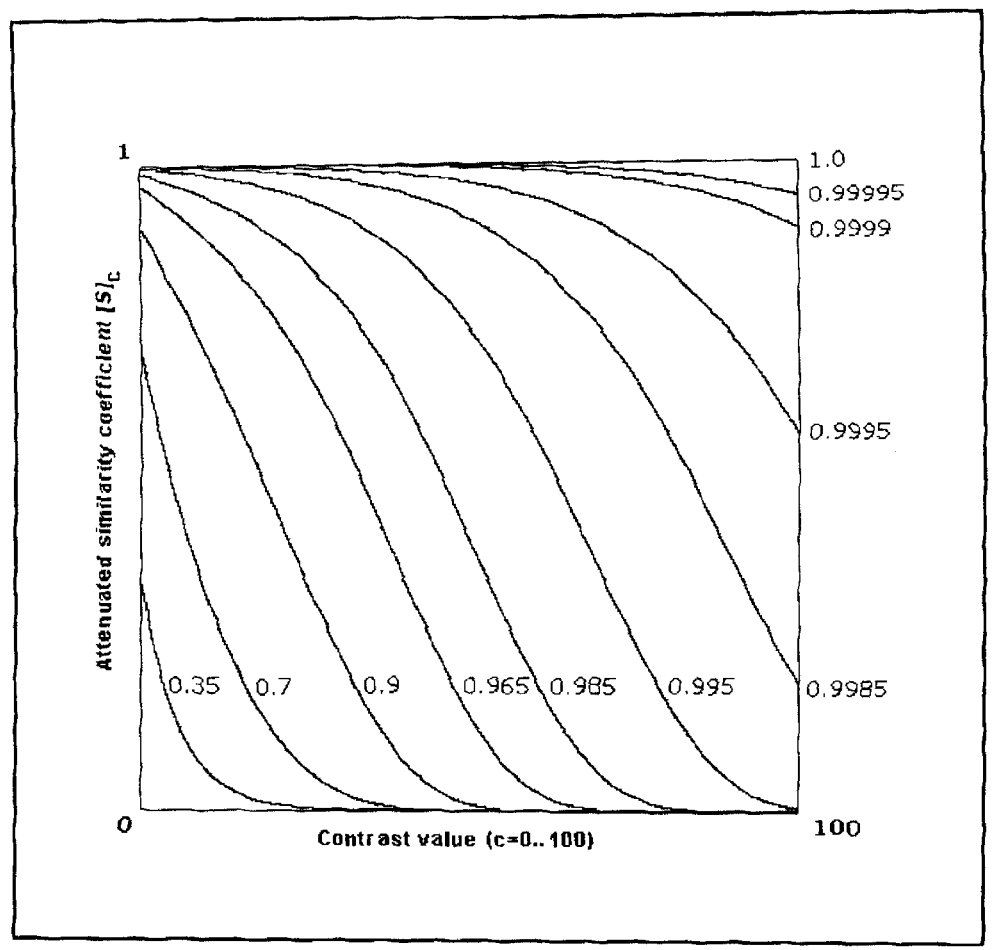
FIG. 9 is an illustration of plots reflecting the changes of attenuated similarity coefficients $[S]_C$ depending on increase of contrast value. The numbers next to each curve correspond to original similarity coefficients.

The next step is a contrasting procedure performed by the use of the contrast formula set forth by the present invention as Formula 3 and shown in FIG. 8, which allows for attenuating a matrix in the course of transformation so that the changes that occur as $S_{x,y}$ values are reaching the limit could be observed. FIG. 9 illustrates contrast-attenuated S values as a function of C, contrast value, upon the contrast increase from 0 to 100. As is seen, by increasing the contrast value, even the most subtle changes of S values, within the range between 0.99995 and 1.0, can be clearly distinguished. By varying the C values in the course of the matrix transformation, not only a sharper picture of the dynamics of $S_{x,y}$ is obtained, but the differences in similarity limit values can be observed. For example, at contrast values varying from 0 to 100 upon the transformation of the target matrix representing four sites of the river's Section D shown in FIG. 7A, the values of limS for site D232 and the cluster of all other three sites of Section D change from 97.0% to 0.0% in the ultimately transformed at zero contrast (C=0) matrix in FIG. 7A; to 73.8% at C=25 as shown in FIG. 10A; to 19.0 at C=50 as shown in FIG. 10B; to 0.1% at C=75 as shown in FIG. 10C; and finally to 0 at C=100 as shown in FIG. 10D, while the similarity within the cluster of the three sites remains to be 100%.

Having explained the effect of a matrix evolution simulation by a simple example of a four-component target matrix, we now refer to the entire original target matrix shown in FIG. 2A. FIG. 2B illustrates the result of 500-stage transformation of the original target matrix at a contrast value of 100. As is seen, the resulting matrix distinctly displays two clusters: 1) the A+B cluster covering Sectors A and B (slow flow sectors), and 2) the C+D cluster covering Sectors C and D (fast flow sectors), and has aligned all 19 river's sites in their proper order, without any discrepancies, starting with the site at the river mouth.

Within the context of the above explanation, the effect of the technique of matrix replenishment can be well demonstrated. FIG. 11 illustrates a result of application of the replenishment technique to recover the missing BS-values in a target matrix. As an example of a target matrix where some of BS-values are missing, the original ABCD-matrix shown above in FIG. 2A is used, with consecutive removal of each of four randomly selected BS-values, A6–B93, A2–C182, C182–C206, and C182–D283. By applying Formula 2 (FIG. 6) each time when one of the values is removed, the missing BS-values are recovered as shown in column R{1} in the table in FIG. 11. Similarly, column R{4} in FIG. 11 shows the results of replenishment of the same target matrix from which all four said BS-values are removed at once, leaving a considerable gap in BS-values for site C182 as three of the four randomly selected and simultaneously removed values appear to be associated with this site. As replenishment procedure is analogous to transformation (compare Formula 1 in FIG. 4 and Formula 2 in FIG. 6), it is interesting to compare the results of replenishment of an incomplete target matrix with the results of a one-stage transformation of the full target matrix shown in column T in the table in FIG. 11. The data presented in FIG. 11 demonstrate that a removal of several of BS-values does not affect transformation performance because upon transformation the fact that some of BS-values in a target matrix equal zero or are missing automatically triggers the replenishment procedure, thus offsetting the effect of the missing values upon the final output.

Figure 12:
FIG. 12 is an illustration of the result of 400-stage transformation of the AB-matrix (fragment of the matrix shown in FIG. 2A presented by Van Sickle, 1997) at a contrast value of 100.

FIG. 12 and FIG. 13 illustrate the results of 400-stage transformations, at a contrast value of 100, of the matrices representing clusters A+B and C+D, respectively. Upon transformation, the A+B cluster falls into two subclusters, A and B, where subcluster B still covers two outliers, sites A2 and A40, which correspond to the beginning and end sites of Section A, respectively. The C+D cluster is subdivided into subclusters without any irregularities. At the third level clusterization of the original ABCD-matrix, the A2 site of subcluster B forms a sub-subcluster. At the fourth level clusterization, two sub-subclusters are formed: 1) sites A40 and B77, and 2) all other B-sites.

Thus, as shown in the above example, clustering occurs in an unsupervised automated mode: in the course of evolutionary transformation, a target matrix reaches the ultimately evolved state and breaks down into clusters; then each cluster undergoes evolutionary transformation and upon reaching the limit breaks down into subclusters; then each subcluster undergoes the same process, and so forth. Unsupervised automated clustering via transformation-division-transformation (TDT) process occurs as long as there are any detectable differences between the matrix components involved in TDT-processing.

Figure 14:
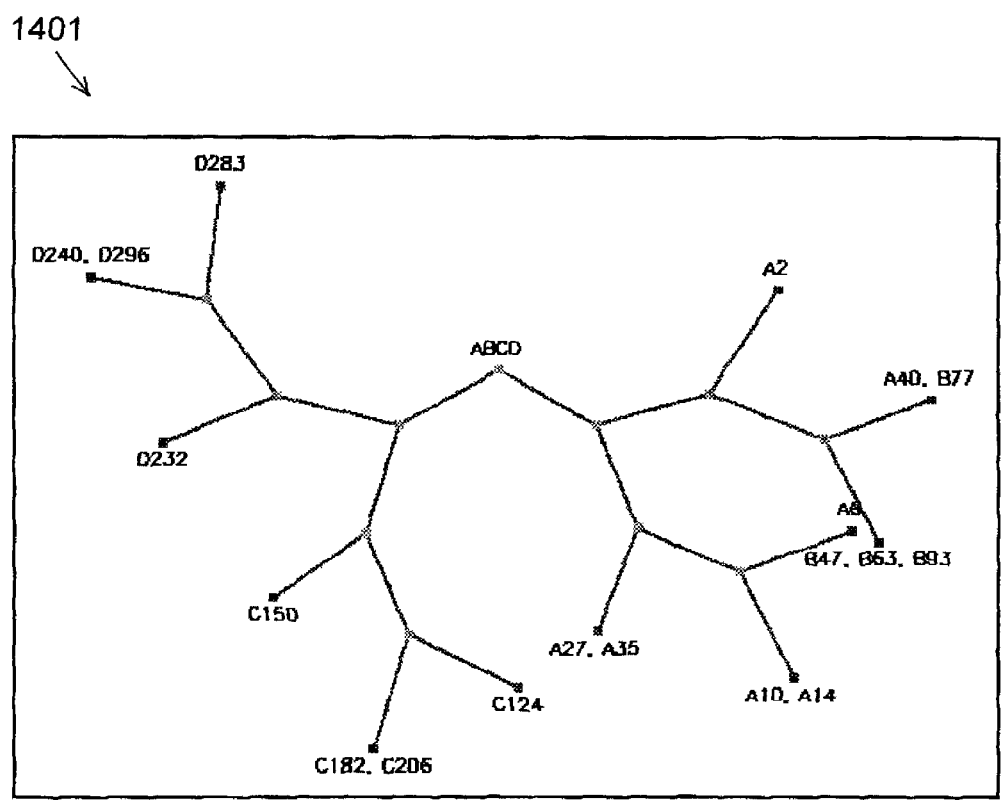
FIG. 14 illustrates a dendrogram obtained by automated clustering of the ABCD-matrix by TDT-processing.

FIG. 14 illustrates a dendrogram of the ABCD-matrix, obtained in an automated mode based on TDT-processing at a maximum number of transformations at each level of cluster differentiation. The algorithm for dendrogram construction is shown in FIG. 15. As is seen, the ultimate indivisible clusters are formed at the node levels from third to forth after the level one whereby the ABCD-matrix was divided into subclusters AB and BC.

Figure 16:
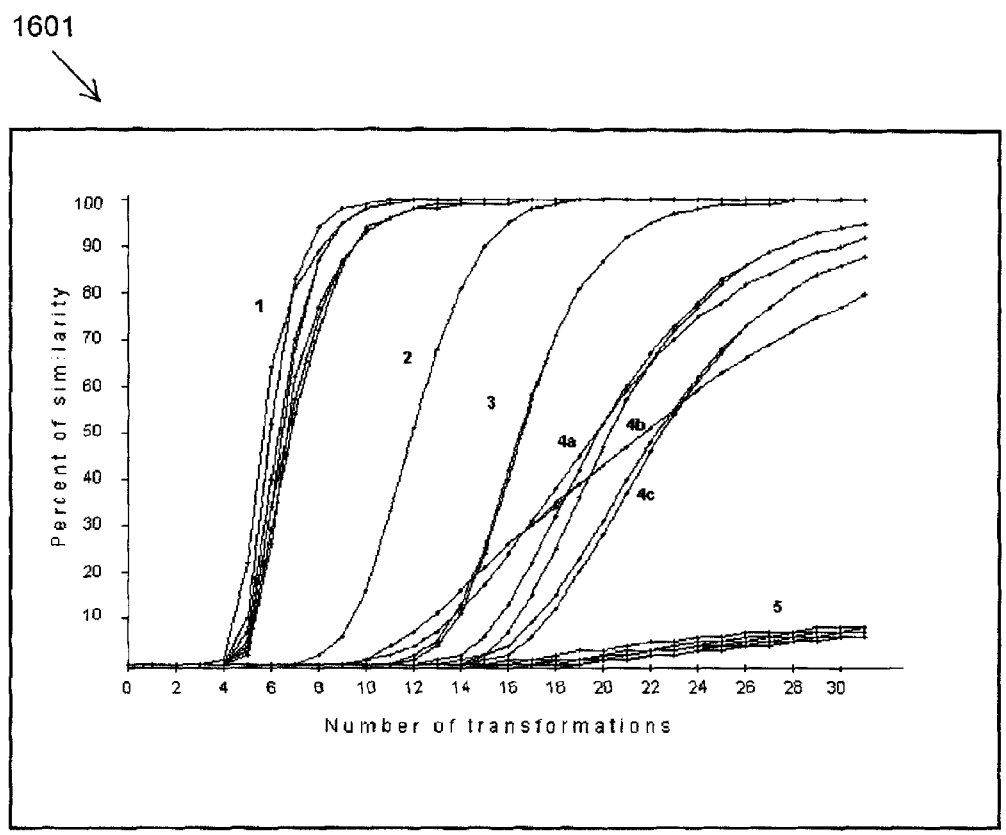
FIG. 16 illustrates DBS-processing of the AB-fragment of the ABCD-matrix at a contrast value of 100. Curve 1 bundle (highest similarity) represents the pairs A6—(A10, A14, A27), A10—(A14, A27), A14–A27, and B63–B93. Curve 2 represents the pairs B47–B63 and B47–B93. Curve 3 represents the pairs B77—(B47, B63, B93). Curve 4A represents the pairs A2—(A40, B47, B63, B77, B93). Curve 4B represents the pairs A35—(A6, A10, A14, A27). Curve 4C represents the pairs A40—all B sites. Curve 5 bundle (lowest similarity) represents the pairs A2—(A6, A10, A14, A27, A35), A6—(A40, B47, B63, B77, B93), A10—(A40, B63, B77, B93), A14—(A40, B47, B63, B77, B93), A27—all B sites, and A35—(A40, all B sites).
Figure 17:
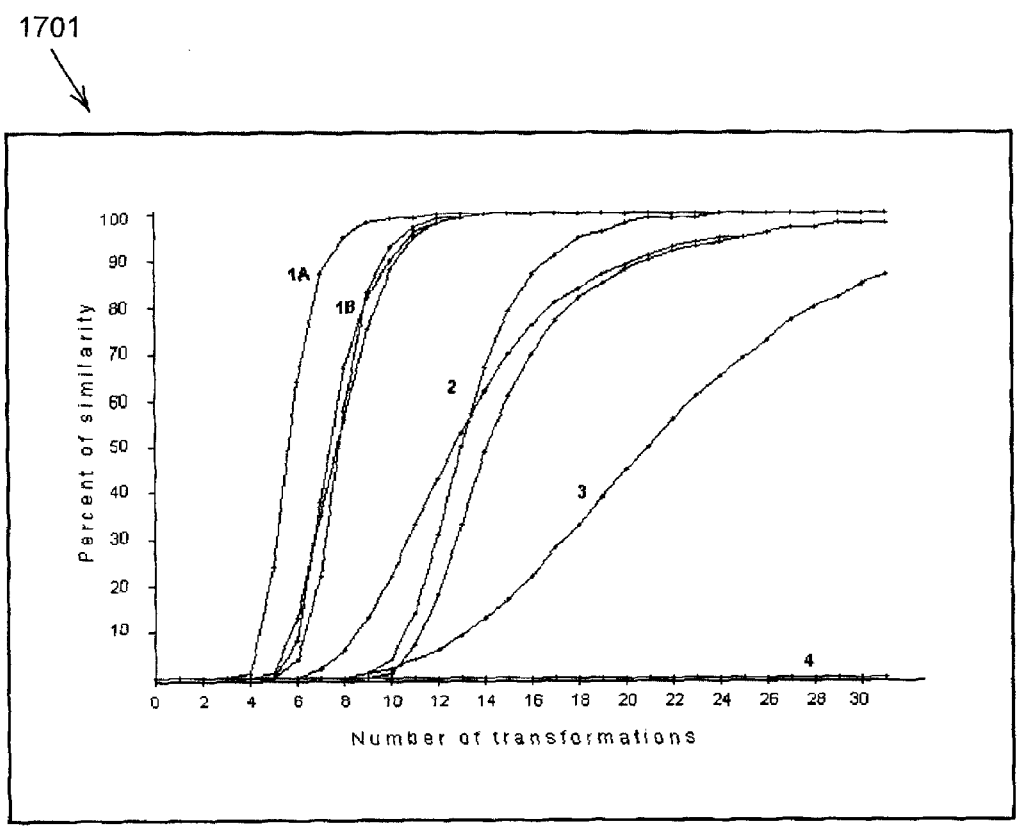
FIG. 17 illustrates DBS-processing of the CD-fragment of the ABCD-matrix at a contrast value of 100. Curve 1A (highest similarity) represents the pair D240–D296. Curve 1B represents the pair C124—(C182, C206). Curve 2 bundle represents the pairs D232—(D240, D283, D296). Curve 3 represents the pairs C150—(C124, C182, C206). Curve 4 (lowest similarity) represents the pairs C124—all D sites, C150—all D sites, C182—all D sites, C206—all D sites (a total of all 16 BS-cells).

In TDT-processing, a matrix is successively clusterized by applying the evolutionary transformation to each level of clusterization, starting with target matrix level. However, elimination of even a single component may affect the cooperative process of a matrix evolution, and, therefore, it is always preferrable to process a matrix as a whole. The present invention sets forth a new technique for discovery of a matrix hierarchical structure in the process of a matrix evolution and with the use of DBS-processing based on the study of dynamics of binary similarities. DBS-processing tracks down all binary similarities during a matrix evolutionary transformation. The following is the illustration of the purpose of DBS-processing by the example of DBS-processing of a target matrix shown in FIG. 2A. FIG. 16 and FIG. 17 illustrate the results of DBS-processing of clusters A+B and C+D, respectively, at a contrast value of 100. Even at a brief survey of the DBS-processing result, it is apparent that cluster A+B definitely displays a larger number of differential groups of similarities, which is indicative of a more complex system structure, than cluster C+D. However, upon comparison of the DBS-processing results of clusters A+B and C+D at a contrast value of 30, it is seen that differences within cluster A+B are not as pronounced and specific as those within cluster C+D.

The following is the description of the bar-graph version of DBS-processing set forth by the present invention. To bar-graph a cluster, a total of all BS values within a certain group of similarities is determined as a percentage of a total possible numbers of BS values. For the purpose of interpretation of the results, a "secant"-line is drawn starting from the point representing a similarity value of 1 or 100% at specified, from 0 to 90°, angles towards axis of ordinates.

Figure 18:
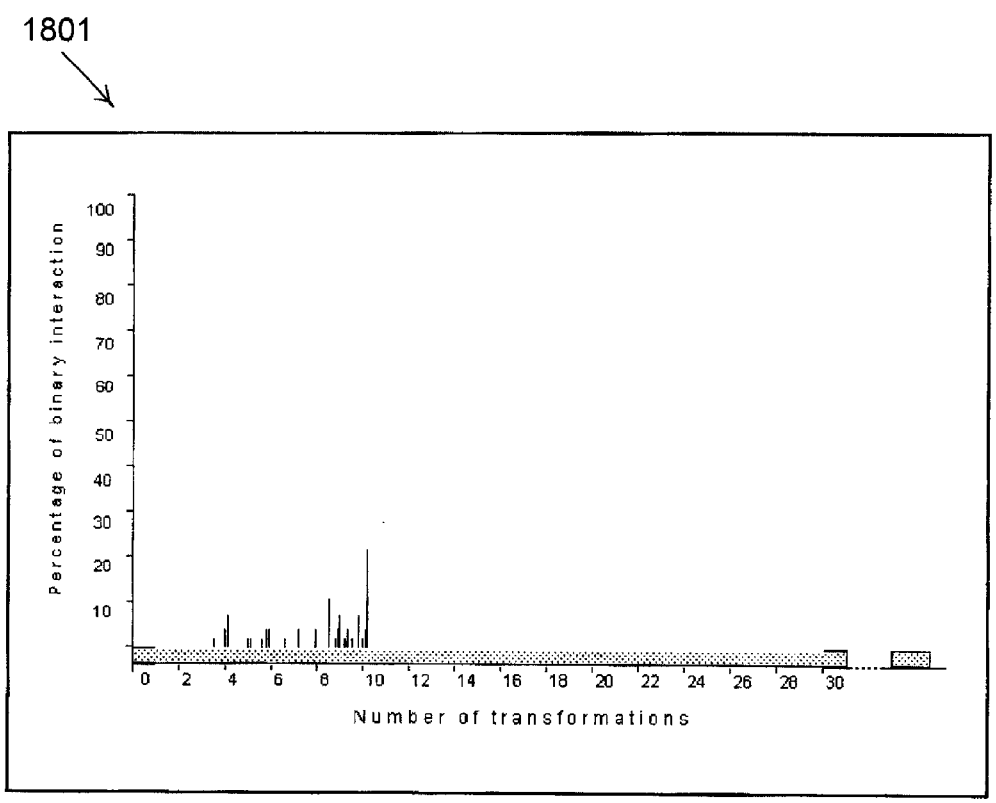
FIG. 18 is an illustration a bar-graph result of DBS-processing of the AB-fragment of the ABCD-matrix at a contrast value of 30 and a secant value of 45°.
Figure 19:
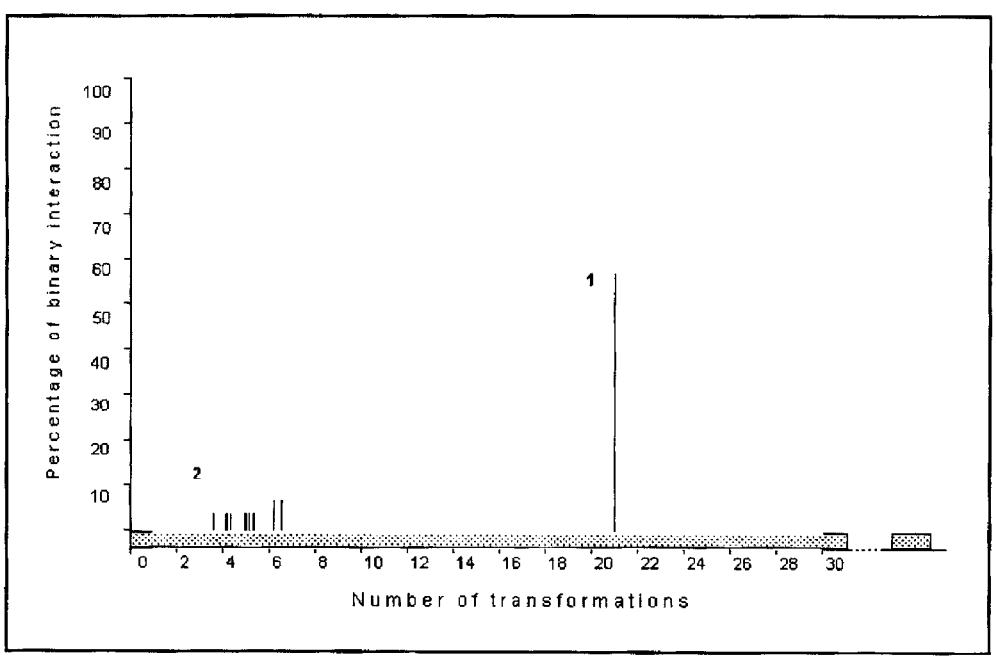
FIG. 19 is an illustration of a bar-graph result of DBS-processing of the CD-fragment of the ABCD-matrix at a contrast value of 30 and a secant value of 45°. Bar 1 represents all C-D similarities; bar 2, all C-C and D-D similarities.

FIG. 18 and FIG. 19 illustrate DBS-processing bar graphs of the AB- and CD-matrices, respectively, at a secant value of 45° and contrast value of 30, which further support the previously made assessment of the nature of similarities and differences in these two fragments of the original ABCD matrix. The bundle of curves representing similarity coefficients of the CD-matrix corresponds exclusively to inter-sectional pairs C-D (see FIG. 18 bar 1, and the legend to FIG. 17); whereas the bundle of curves representing a substantially higher level of similarities correspond exclusively to intrasectional pairs: C-C and D-D (see FIG. 19 bar 2). In the AB-matrix, both inter- and intrasectional pairs emerge (see the legend to FIG. 17, and well as FIG. 18), and the similarities between the sites vary from very high to medium level. Since the AB-matrix represents the slow flow sections of the river, the specifics of this matrix may be an indication of a lower level of ecological priorities of the fish population in these sections as compared to the fast flow sections.

As demonstrated by the above description of the present invention and examples of its implementation, the principle of the method by similarity matrix evolution resides in multi-stage consecutive recovery of quantitative associations that exist between each matrix component as part of a complete, closed and cooperative system and all other matrix components, which ultimately produces a qualitatively new result in the form of an automatically drawn conclusion about the hierarchy of matrix components relationship. Briefly put, evolutionary transformation activates matrix's "associative reasoning". By drawing a parallel between a matrix of similarities associated with characters of objects or occurrences and a matrix of similarities associated with events or ideas and understood as a neural network prototype, the evolutionary transformation represents a basic operative model of associative reasoning.

In the above description of this invention it is clearly seen that a similarity matrix set for evolution by the effect of the algorithm described in this invention presents nothing but a self-learning system wherein the information produced and accumulated in the process of transformation is conveyed to a newly derived successor-matrix which, in its turn, produces and accumulates a new layer of information based on the associative capacity of a predecessor-matrix and conveys it to the next successor-matrix. This process is accompanied with self-occurring clustering, i.e. the transformation process itself attributes the produced information, finally and irreversibly, to the respective groups of objects. Such groups may either be individually subjected to further evolutionary transformation, or combined with related clusters produced by other matrices undergoing parallel transformation and enter a new cycle of transformation. This advantage of an evoluting matrix makes it usable as a constructive element of an artificial intelligence system.

The invention is preferably carried out with a general purpose computer comprising a CPU (central processing unit), RAM (random access memory), a video controller and an output device such as a monitor or a plotter.

While the present invention has been described herein in detail in connection with the preferred embodiments, the invention is not limited to such disclosed embodiments, rather it can be modified to incorporate any number of variations, alterations, or equivalent arrangements in accordance with the principles of the invention. All such embodiments and variations and modifications thereof are considered to be within the spirit and scope of the invention, as defined in the appended claims.

I claim:

1. A computer-based method for automated unsupervised clustering of data through simulation of successive and irreversible evolution of a similarity matrix by means of successive series of evolutionary transformations, said transformations consisting in an effect of a certain function so that each of binary similarity values is replaced by a certain value derived from binary similarities between all other components and each of two components of the binary similarity under computation, and said transformations resulting in obligate occurrence of the herein described conditions:

a) starting with a first transformation in said successive series of evolutionary transformations, each newly derived matrix is ensuant on a previous one, hence said evolutionary transformations are irreversible and occur in a quasi-continuous mode;

b) a series of iterative transformations make each binary similarity value reach a limit;

c) said limit may differ in different binary similarities;

d) said limit of binary similarities is reached at different stages of iterative transformations.

2. The method of claim 1 wherein said evolutionary transformation is achieved by the use of a geometric mean over ratios of binary similarities between one of two objects, whose similarity coefficient is under computation, and all other objects of a matrix to respective binary similarities between a second of two objects, whose similarity coefficient is under computation, and all other objects of a matrix, in such a way that each ratio of $S_{i(x)}$ to $S_{i(y)}$ is normalized to 1.

3. The method of claim 1 wherein a matrix in the course of evolutionary transformation divides into clusters, wherein each of said clusters individually undergoes evolutionary transformation and divides into subclusters, said procedure being iterated until all subclusters are indivisible and terminal.

4. The method of claim 3 wherein said hierarchical clustering and subclustering occur in unsupervised and fully automated mode.

5. The method of claim 1 wherein each binary similarity displayed by a matrix during evolution is recorded in the course of matrix processing.

6. The method of claim 5 wherein binary similarity dynamics are used for locating closest analogs of analyzed objects in a process of informational search.

7. The method of claim 6 wherein binary similarity dynamics are used for evaluation of clusterization capacity of a similarity matrix.

8. The method of claim 2 wherein data-in similarities are converted into any form of derivatives which are linearly or non-linearly proportional to data-in similarity coefficients.

9. The method of claim 8 wherein all similarity coefficients of a matrix are converted into exponential functions, said conversion to be applied to matrices containing similarity coefficients that are negative or equal zero, said conversion permitting to apply evolutionary transformation to matrices containing one or more negative or zero similarity coefficients; and said conversion securing adequacy of final output of matrix transformation.

10. The method of claim 2 wherein, prior to conducting a matrix evolutionary transformation, any missing similarity coefficients are recovered based on similarity coefficients available in a matrix, said recovery of similarity coefficients being performed by the use of replenishment operation, said replenishment operation being analogous to evolutionary transformation operation wherein a geometric mean is computed over available similarity coefficients whereas missing similarity coefficients are disregarded.

11. A method for contrasting of similarity coefficients by modification thereof, proportionately and in synchronism, at any stage of evolutionary transformation, said modification performed by application of the procedure of contrasting according to a certain formula, said contrasting providing for broadening of ranges of similarity coefficients of a matrix under evolutionary transformation, said contrasting allowing, in particular, for differentiation of such subtle changes of similarity coefficients as within a range from 0.99995 to 1, thus allowing for precision monitoring of matrix behavior in the course of asymptotic transition of similarity coefficients towards limit.

12. The method of claim 1 wherein an evolving matrix represents a self-learning system of successive matrices wherein each predecessor-matrix recovers information and conveys recovered information to an ensuant matrix, said ensuant matrix recovers information from predecessor-conveyed information and conveys newly recovered information to a next ensuant matrix, said whole process involving irreversible distribution of information to clusters, thus said self-learning matrix system representing a constructive element of an artificial intelligence system.

* * * * *